(12) United States Patent
Kamdar et al.

(10) Patent No.: US 8,712,446 B2
(45) Date of Patent: Apr. 29, 2014

(54) METHOD AND APPARATUS FOR OPTIMIZING PAGING IN A COMMUNICATION NETWORK

(75) Inventors: Kashyap Kamdar, Palatine, IL (US); Sania C. Irwin, Glen Ellyn, IL (US)

(73) Assignee: Motorola Mobility LLC, Chicago, IL (US)

( * ) Notice: Subject to any disclaimer, the term of this patent is extended or adjusted under 35 U.S.C. 154(b) by 1177 days.

(21) Appl. No.: 11/836,505

(22) Filed: Aug. 9, 2007

(65) Prior Publication Data

US 2009/0042587 A1 Feb. 12, 2009

(51) Int. Cl.
*H04W 68/00* (2009.01)
(52) U.S. Cl.
USPC .......................................... 455/458; 455/436
(58) Field of Classification Search
None
See application file for complete search history.

(56) References Cited

U.S. PATENT DOCUMENTS

| | | | |
|---|---|---|---|
| 5,533,094 A | 7/1996 | Sanmugam | |
| 5,875,400 A * | 2/1999 | Madhavapeddy et al. | 455/458 |
| 5,966,662 A | 10/1999 | Murto | |
| 6,035,203 A | 3/2000 | Hanson | |
| 6,535,745 B1 | 3/2003 | Seraj | |
| 6,745,039 B1 * | 6/2004 | Di Lalla | 455/458 |
| 6,980,818 B2 * | 12/2005 | Harris et al. | 455/466 |
| 7,489,936 B1 * | 2/2009 | Liu | 455/456.1 |
| 2004/0198353 A1 | 10/2004 | Quick, Jr. | |
| 2004/0203770 A1 | 10/2004 | Chen et al. | |
| 2006/0025161 A1 | 2/2006 | Funato et al. | |
| 2006/0068802 A1 | 3/2006 | Benco et al. | |
| 2007/0249347 A1 * | 10/2007 | Saifullah et al. | 455/436 |
| 2008/0188247 A1 * | 8/2008 | Worrall | 455/458 |

FOREIGN PATENT DOCUMENTS

| | | |
|---|---|---|
| JP | 10091102 | 4/1998 |
| JP | 2001069562 | 3/2001 |
| WO | 0145449 A1 | 6/2001 |

* cited by examiner

*Primary Examiner* — German J Viana Di Prisco (57) ABSTRACT

A method and corresponding entity for optimizing paging process in a communication network. The method comprises of sending (408) the paging signal to the at least one access point in a group associated with the current priority level and determining (410) whether a page response is received from the at least one access point in the group associated with the current priority level. The method includes updating the (412) the group associated with the current priority level based on the mobility observed at each access point in the group. The method further comprises assigning (414) a next priority level in the list of priority levels as the current priority level and repeating the above steps until the page response is received.

17 Claims, 6 Drawing Sheets

FIG. 1

LIST OF PRIORITY LEVELS MAINTAINED IN AN ACCESS POINT

| PRIORITY LEVELS | RANGE OF WEIGHTS | ACCESS POINT IDENTIFICATION NUMBER | WEIGHT OF ACCESS POINTS | UPDATE FLAG |
|---|---|---|---|---|
| $P_1$ | 100-60 | 104 | 84 | TRUE |
|  |  | 106 | 72 | FALSE |
|  |  | 108 | 60 | FALSE |
| $P_2$ | 30-59 | 110 | 59 | TRUE |
|  |  | 112 | 48 | FALSE |
|  |  | 114 | 34 | FALSE |
|  |  | 116 | 30 | FALSE |
| $P_3$ | 1-29 | 118 | 29 | FALSE |
|  |  | 120 | 19 | FALSE |
|  |  | 122 | 10 | TRUE |
|  |  | 124 | 08 | FALSE |

METHOD AND APPARATUS FOR OPTIMIZING PAGING IN A COMMUNICATION NETWORK

FIELD OF THE INVENTION

The present invention generally relates to communication networks and more particularly relates to optimized paging in a communication network.

BACKGROUND

A wireless communication system typically consists of a plurality of cells served by a number of access points. Typically, the access points are grouped into paging areas to help with a paging process. A mobile station can move within a paging area or from one paging area to another paging area. In general, the movement of mobile station within the communication system is known as mobility of the mobile station. As the mobile station travels, it registers with an access point associated with the location of the mobile station's position. Thus, the location of the mobile station is updated to the communication system and can be later used for other system operations. Also, the location data of the mobile station is constantly recorded as the mobile station moves within the system, and the current location of the mobile station is reported to the system. At some instances, however, the location of the mobile station may be unknown to the communication system because of different modes in which the mobile station travels.

In general, the mobile station operates in at least two modes, namely, a connected or active mode and an idle mode. Mobile stations can also operate in sleep mode, which is similar to idle mode. In the connected or active mode, the mobile station, among other operations, establishes a call or participates in an active communication with another communication device such as another mobile station. If the mobile station moves to a new cell during active mode, the control of the communication with the mobile station is handed over to the new cell. Thus, in connected mode, the location and a serving cell for the mobile station is well known to the communication system.

On the other hand, if there is no active communication, the mobile station switches to the idle mode to conserve battery power. Because of mobility during the idle mode, the communication system may not know the location of the mobile station at the same level of precision as when the mobile station is in the active mode because the mobile station is not in active communication with the network. In idle mode, the location of the mobile station is typically known only when it registers with an access point in a new paging area. Thus, when a communication with the mobile station in idle mode is desired, a paging process is utilized by the communication system to locate the mobile station. The paging process is performed by sending poll messages to all the cells in that paging area. As the communication system grows, the system cost of paging the mobile stations increases because of the additional area and equipment that must be covered by the poll messages.

Conventionally, a paging process broadcasts a paging request to all the access points of a paging area in which the mobile station last registered. This, however, increases the cost for paging and may be an inefficient utilization of the bandwidth since the paging request is sent to all the access points in the paging area. As a result, the paging process uses a large amount of radio resources.

Several approaches have been proposed for the paging process to overcome the aforementioned problems. These approaches, however, focus on the architecture of the communication system. Further, these approaches permit unlimited overlapping of paging areas as well as dynamic changes in the configuration of the communication systems based on the movement of traffic. These architecture based approaches require modifications in the existing communication system and thus, introduce additional implementation costs.

Accordingly, it would be desirable to have an improved method and apparatus to better the signaling traffic and reduce the paging cost in the network by utilizing the existing communication system.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing any details, it should be observed that the embodiments reside primarily in an apparatus and method for optimizing paging in a communication network. Accordingly, the apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of this description.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that the embodiments described herein may be comprised of one or more conventional processors and unique stored program instructions that control the one or more processors to implement, in conjunction with certain non-processor circuits, some, most, or all of the functions required for optimizing paging in a communication network are described herein. The non-processor circuits may include, but are not limited to, a radio receiver, a radio transmitter, signal drivers, clock circuits, power source circuits, and user input devices. As such, these functions may be interpreted as steps of a method for optimizing paging in a communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Various embodiments are disclosed herein. For example, one method for optimal paging in a communication network includes maintaining a list of priority levels that define an area in which the paging signals are sent. Each of the priority levels is associated with a group of at least one access point found in the communication network. The method also includes initializing a current priority level from the list of priority levels and sending the paging signal to the at least one access point in a group associated with the current priority level. The method then includes determining whether a page response is received from the at least one access point in the group associated with the current priority level. The method further includes updating the group associated with the current priority level. The method then includes assigning a next priority level in the list of priority levels as the current priority level when no page response is received from the at least one access point in the group associated with the current priority level. In an embodiment, the priority levels are determined by the mobility of mobile stations with respect to the access points in a paging area. As the mobility of the mobile stations operating in a paging area increases and decreases the weighing of the priority level of the access points increases and decreases and is adjusted and modified.

Another embodiment includes an apparatus for optimal paging in a communication network. The apparatus includes a memory for maintaining a list of priority levels, wherein each of the priority levels is associated with a group of at least one access point. The apparatus also includes a processor coupled to the memory and operable to determine whether a page response is received from the at least one access point in the group associated with a current priority level. The paging signal is then sent to the at least one access point in the group associated with a next priority level only when no page response is received from the current priority level. The processor is further operable to update the weight of an access point based on the mobility observed at the access point.

In yet another embodiment, a method includes creating a list of priority levels, wherein each of the priority levels is associated with a group of at least one access point. The method also includes selecting a group associated with a priority level in the list for sending a paging signal. The method then includes updating a weight of an access point in the selected group associated with the priority level. The method further includes associating the access point with one of the list of priority levels based on the updated weight of the access point. The weight of the access point can be updated by monitoring the mobility of the mobile stations operating and associated with the various access points.

Figure 1:
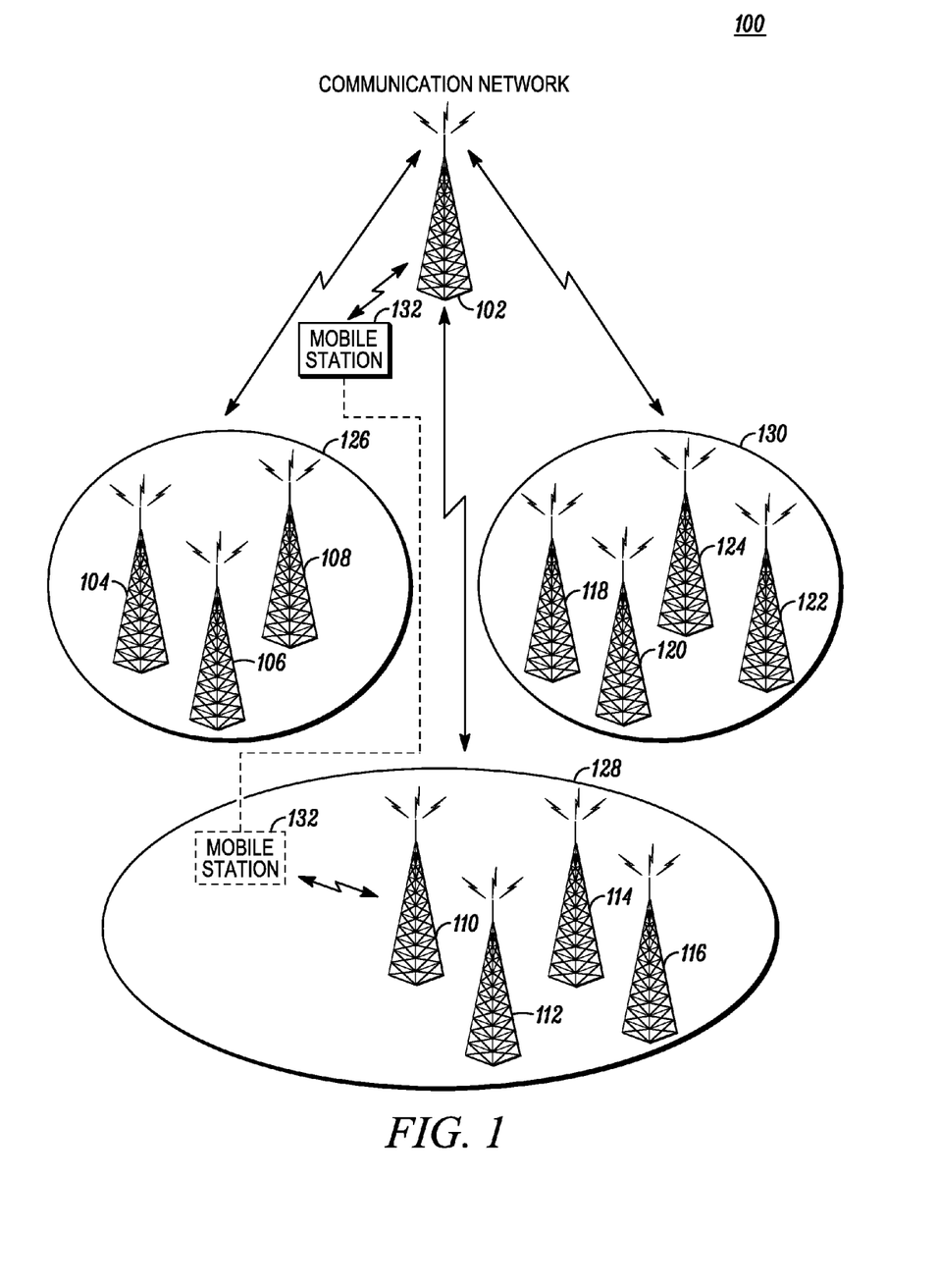
FIG. 1 is a block diagram of a communication network in accordance with some embodiments of the invention.

FIG. 1 illustrates a block diagram of a communication network 100 that the embodiments described utilize. The communication network 100 includes a plurality of access points 102-124 located at different positions in the communication network 100. Each of the access points 104-124 are grouped into one of a plurality of groups 126-130. For example, the access points 104-108 are associated with a group 126. Similarly, the access points 110-116 are associated with a group 128, and the access points 118-124 to a group 130. The communication network 100 may include any number of access points and may be associated with any number of groups based on the requirements of the communication network 100. In an embodiment, groups are formed based on the number of times the access points are involved in connected and idle mode mobility. Other criteria, e.g. performance factors, can also be used to form groups. As shown, groups include any number of access points and can also be comprised of paging areas and similar configurations. In an embodiment, the cells in a geographical area are grouped together to form paging area. Each cell has an access point that serves the mobile stations within the cell, and each cell may be part of one or more paging areas.

In connected mode mobility, if the mobile station enters a new cell, the control of the communication with the mobile station is handed over to the new cell. The process is known as handoff. Thus, in connected mode mobility, the location of the mobile station is known by observing handoff at each access point. Similarly, in idle mode, the position of the mobile station is located by sending paging messages to all the access points in the last known paging area. The process is known as paging. Thus, in idle mode mobility, the location of the mobile station is known by observing paging process at each access point. In one embodiment, in idle mode, the mobile station performs update procedure when the mobile station travels from one paging area to another paging area. The update procedure relates to updating the current location of the mobile station to the network 100. Mobility with paging process is determined by observing the responses sent to paging messages from the access points operating in the network 100. The connected mode mobility and idle mode mobility are collectively referred to as mobility.

Access points 102-124 are configured to operate according to any of a number of different 2G, 3G and 4G wireless communication technologies. These include Global System for Mobile Communication (GSM), Code Division for Multiple Access (CDMA), Universal Mobile Telecommunication System (UMTS), Wideband Code Division for Multiple Access (W-CDMA), Orthogonal Frequency Division Multiplexing (OFDM), Worldwide Interoperability for Microwave Access (WiMax), Long-Term Evolution (LTE) and other communication technologies. Access points 102-124 can be base stations or access nodes that transmit and receive signals to and from mobile stations and other devices operating within the communication network 100. In addition, the access points 102-124 transmit and receive signals between different access points and network infrastructure components (not shown) that provide wireless communication to the mobile stations operating within the communication network 100. An actual communication network may be significantly more complex and may include various additional known entities, such as base site controllers, billing, authorization, authentication, and voice mail servers that are not directly relevant to the present discussions. It is possible that neighboring communication networks can operate using the same or different communication technologies. The access points 102-124 may also communicate with each other or with any other access points using an IEEE 802.16-based wireless metropolitan area network or other technologies. The embodiments described focus on establishing communication between access points 102-124.

In an embodiment of FIG. 1, a mobile station 132 resides in the cell served by the access point 102. There are different access points 102-124 that serve a plurality of cells in the same paging area. The mobile station 132 is free to move anywhere within the communication network 100. As the mobile station 132 enters a new cell, the control of the mobile station 132 would be handed over from a serving access point to an access point associated with a new cell. For example, if the mobile station 132 travels from the cell served by the access point 102 to the cell served by the access point 110 in the active or connected mode, the control of the mobile station 132 would be handed off to the access point 110. Thus, the location of the mobile station is known at the cell level in connected or active mode mobility.

If the mobile station moves in the idle mode or sleep mode, the location of the mobile station is unknown until the mobile station moves across the paging area and registers with a new paging area. Thus, in idle or sleep mode mobility, the location is known at paging area level. If the mobile station moves in the idle or sleep mode within the paging area, the location of the mobile station is unknown to the communication network 100. Thus, the paging process is employed to locate the mobile station and the access point within the paging area.

Figure 2:
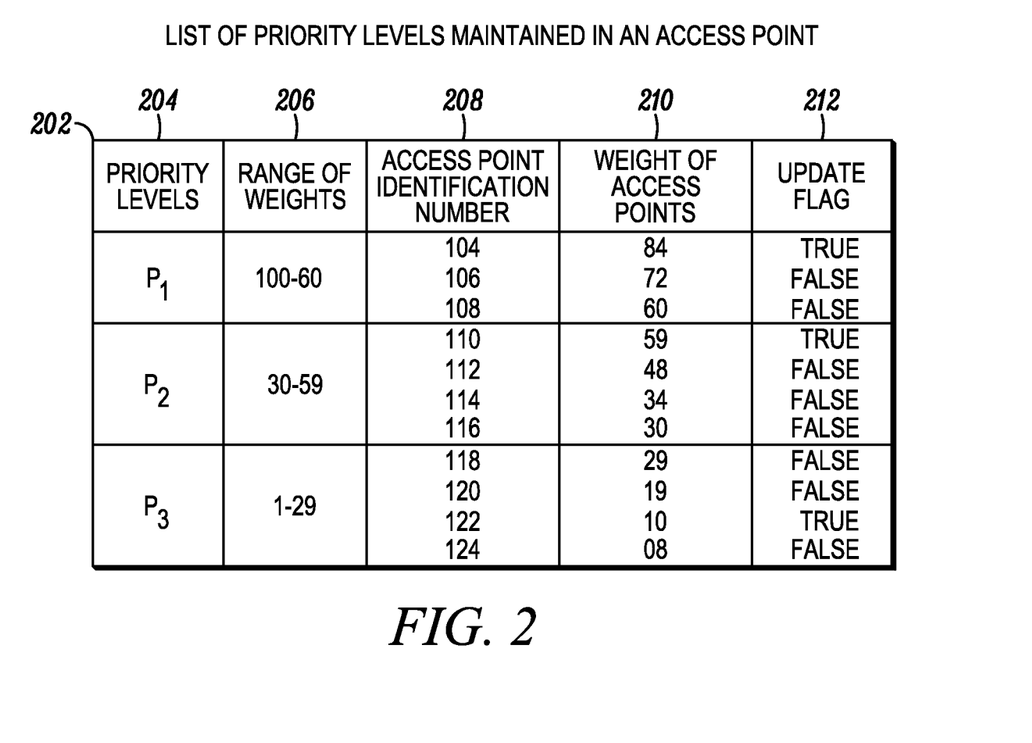
FIG. 2 is a list of priority levels maintained in an access point in accordance with some embodiments of the invention.

FIG. 2 is a list 202 of priority levels maintained in an access point in accordance with some embodiments of the invention. The list of priority levels 202 may be maintained in each of the access points 104-124, or may be placed in a common centralized subsystem (not shown) serving all the access points 104-124 in the communication network 100. Referring to FIG. 1, the access points 102-124 exchange data related to the mobility of the mobile stations observed at each of the access points 102-124. Mobility observed may be due to handoff, paging or any similar processes for the mobile stations communication with a particular access point. For example, if the access point 110 takes control over the mobile station 132 in the connected mode then the handoff is observed at the access point 110. Similarly, in idle mode, if the access point 110 responds to a paging signal received from the access point 102, the mobile station 132 is within the coverage area of the access point 110, and thus the paging is observed at the access point 110.

The exchanged data is further utilized in assigning a weight to each of the access points 102-124 in the communication network 100. The assigned weight represents the mobility observed at each of the access points 102-124. In an embodiment, the access points that are more frequently involved in mobility with respect to mobile stations will have higher weights and the access point that are occasionally involved in mobility will have lower weights. Thus, there is a higher probability of mobile station being handed over or found during paging for the access points with higher weight than for the access points with lower weight.

Each of the access points 102-124 creates and maintains a list of priority levels 202 based on the weight assigned to other access points in the communication network 100. For example, the access point 102 maintains the list of priority levels 202 based on the weight assigned to the access points 104-124 in the communication network 100. Each priority level in the list 202 is associated with a group of at least one access point. In an embodiment, each priority level is associated with a range of weights, and the access points 104-124 in the communication network 100 are assigned to any one of the groups 126-130 associated with the priority levels based on their individual weight.

FIG. 2 shows the list of priority levels 202 created and maintained by the access point 102 with reference to groups 126-130. Similar lists 202 are created and maintained by other access points in the communication network 100. As shown, the communication network 100 comprises three groups 126-130, wherein each group has a plurality of access points with weights within the associated range. The list 202 shows three priority levels P1-P3. For example, priority level P1 is associated with the range of weights between 60 and 100, and thus include the group of access points 104-108 that have the weights within that range. Similarly, priority level P2 is associated with the range from 30 to 59. The access points 110-116 having weights within that range of 30 to 59 are therefore associated with priority level P2. Further, priority level P3 is associated with the range of weights between 1 and 29 and, as such, access points 118-124 are assigned to a group associated with priority level P3.

In an embodiment, if the mobile station connected to the access point 102 moves out of the corresponding serving cell, there is a higher probability of mobile station being in the coverage area of the access points in the group associated with the higher priority levels, which is based on the mobility of all mobile stations associated with the access point and that operate in the network 100. Thus, a paging signal is first transmitted in the coverage area of the access points in the highest priority levels. If no page response is received from the access points with a given priority level then the paging signal is transmitted to the next lower priority levels. Note, there can be any number of priority levels and each priority level may be assigned with any range of weights.

Column 204 shows priority levels P1-P3 in the list of priority levels 204. Column 206 represents the range of weights associated with each priority level. Column 208 indicates an identification number for each of the access points 104-124 grouped into the respective priority level. The identification number shown is a number representing an access point and can be any other type of identification for the access points. Column 210 represents the weight of each access point in the communication network 100.

Column 212 shows status of a flag register associated with each access point. There can be any other similar hardware that indicates the status of the access point. The status of the flag register is updated based on the page response or the mobility observed at the corresponding access point. Thus, if mobility is observed then the status of the corresponding flag register is changed to "True," otherwise, the status of the flag register remains "False."

In an embodiment, the weight of an access point is increased when mobility of any mobile station, e.g. active mode mobility or idle mode mobility, is detected at that access point. If after a given period of time, however, no mobility is detected for that access point, the weight can be decreased. The update flag in column 212 can be used to determine if mobility has been detected in a given period of time. In an alternate embodiment, the weight of an access point can be modified after the expiry of a priority refresh timer, based on the status of their respective flag registers. For example, if the status of the flag register is "True" then the weight of the corresponding access point is incremented. Otherwise, it is considered that there is no mobility observed at the corresponding access point for a pre-determined time interval, and thus, the assigned weight is decremented. Thus, the weight of each access point would be decremented after a pre-determined time interval and accordingly the access point is re-associated with the corresponding priority level.

Figure 3:
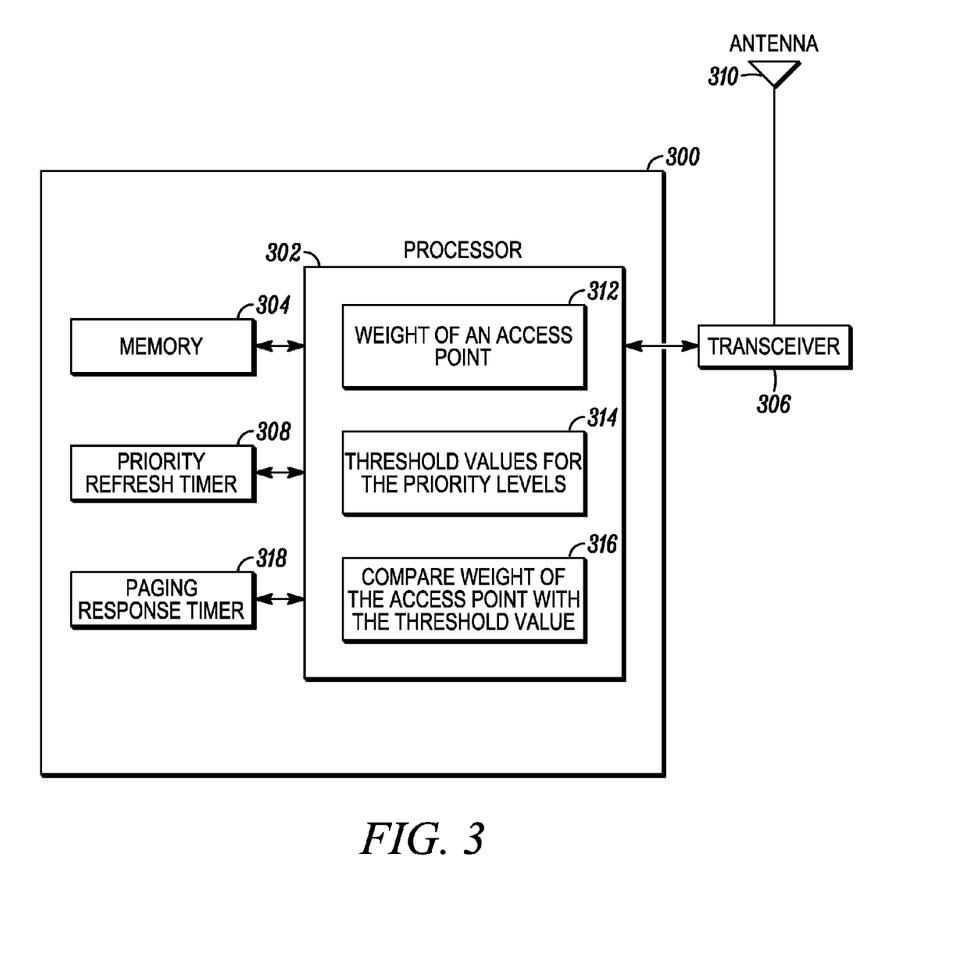
FIG. 3 is a block diagram of a paging entity in an access point in accordance with some embodiments of the invention.

Referring to FIG. 3 is a block diagram of a paging entity for an access point. FIG. 3 is a simplified and representative block diagram of a paging entity 300 suitable for use in the communication network 100 of FIG. 1. The paging entity 300 can be implemented on each of the access points 102-124 of FIG. 1 or can be placed in a centralized sub-system (not shown) connected to all the access points 102-124 in the communication network 100. For optimized paging, as described, the entity 300 utilizes a processor 302 for paging and for tracking the current location of mobile stations operating in the communication network 100. The processor 302 is coupled to an antenna 310 via a transceiver 306. The transceiver 306 is known and can vary with the access technology but operates as a receiver and transmitter for receiving and transmitting radio signals via the antenna 310 to the access points within the respective coverage areas.

In an embodiment of the invention, a memory 304, which is coupled to the processor 302, stores the list of priority levels 202, wherein each priority level is associated with a group of at least one access point. Initially, the list of priority levels 202 is created by exchanging a data related to mobility activity observed at each access points 102-124. In an embodiment, each access point in the paging area will broadcast the data related to number of times the access point involved in the handoff process, paging process or any similar process within the communication network 100. The received data reflects the amount of mobility taken place at the access point and the probability of the mobile station being in the coverage area served by the access point. In an embodiment, each access point in the paging area will keep track of the data related to number of times the access point involved in the handoff process, paging process or any similar process within the communication network 100 and use this data for creating the list of priority levels 202. Each priority level P1-P3 includes at least the weight of the access points, range of weights assigned to each priority level and identification number of the access points. The processor 302 coupled to the memory 304 utilizes this data for optimal paging in the communication network 100.

In an embodiment, a paging response timer 318 is coupled to the processor 302 for monitoring the time period within which a page response is expected from at least one access point in the group associated with a current priority level. If no page response is received from the access points in the group within the pre-determined time interval set by the paging response timer 318, the paging signal is transmitted to the coverage area of the access points in the next lower priority level.

In an embodiment, the processor 302 comprises different modules 312-316 that are utilized for sending the paging signal, observing mobility activity and updating the priority level associated with the access points. The processor is operable for measuring and modifying or updating the weight of each access point by utilizing an updating module 312. The updating module 312 monitors for any mobility activity of the mobile stations operating with each of the access points 104-124. If mobility is observed within the pre-determined time interval, the weight of the access points is incremented. Otherwise, upon expiry of the priority refresh timer 308, the weight of the access points, where no mobility is observed, is decremented.

In an alternate embodiment, the updating module 312 monitors for any page response received for the transmitted paging signal. If the page response is received, the status of the corresponding flag register is changed to "True", otherwise, the status remains "False." Upon expiry of the priority refresh timer 308, the updating module 312 decrements the weight of the access points whose status remains "False." For example, the access point 110 in the group 128 associated with the priority level P2 responds to the paging signal by sending the page response within the pre-determined time interval set by the paging response timer 318. Thus, mobility with the paging process is observed at the access point 110 and the corresponding update flag is changed to "True" state. Further, as no page response is received from the access points 112-116 in the group 128, the status of the corresponding flag registers remains "False." Updating module 312 further monitors for any other mobility activity at the access points 112-116 for the pre-determined time interval set by the priority refresh timer 308. If no mobility is observed within the pre-determined time interval, the weight of the access points 112-116 whose status is "False" is decremented.

Similarly, the processor 302 includes a threshold module 314 that is operable to store a threshold values for each of the priority levels. Threshold values are pre-defined values that represent the range for weights for a group of access points in each priority level. Accordingly, as a value passes a threshold, an access point is associated from one priority level to another priority level. Further, the processor 302 is operable to compare the updated weight of the access point with the threshold values and re-associating the access point to one of the list of priority levels, using the comparison module 316.

In an embodiment, the mobile station 132 that is connected with the access point 102 moves to a different location in the idle or sleep mode. The access point 102 is unaware of the new location of the mobile station 132. When the access point 102 needs to locate the position of mobile station, the paging entity 300 within the access point 102 is employed. In particular, the processor 302 obtains the current priority level from the list of priority levels stored in the memory 304 for sending the paging signal to the access points in the group associated with the current priority level. In an embodiment, the access point starts with the highest priority level where there is a high probability of mobile station is located based on the mobility of the mobile stations operating with the access point in priority level P1. The paging signal is transmitted via transceiver 306 to the access points 104-108 within group 126 associated with priority level P1. The page response is expected from at least one access point in the group 126 within the pre-determined time interval set by the paging response timer 318.

If the paging entity 300 fails to receive the page response within the pre-determined time interval the paging signal is further transmitted to the access points associated with the next priority levels. The process continues until the mobile station is located or mobile station is considered unreachable because the mobile station 132 has been paged from the access points 104-124, but no page response has been received. Thus, the paging signal is optimized by paging first to the access points where the mobile station is most likely to be.

In an embodiment, the processor 302 is further operable for obtaining the threshold values using threshold module 314 and comparing the modified or updated weights with the threshold values, utilizing the comparison module 316. The access point is re-associated with a different priority level when the modified or updated weight of the access point passes the threshold value of the priority level. For example, if no page response is received or no handoff is observed from the access point 108 in priority level P1 after the expiration of the priority response timer 308, the weight of the access point 108 is decremented by one. In such a case, the updated weight of the access point 108 would be 59. Further, the updated weight 59 is compared with the threshold value 60 stored in the threshold module 314 using the comparison module 316. As the updated weight 59 of the access point 108 is below the threshold range of 60, the access point 108 is re-associated with the next lower priority level P2. Similarly, increments in the weight of the access point 110 in priority level P2 would re-associate the access point 110 to the priority level P1, as it has exceeded the range 30-59 assigned to priority level P2. As such, the paging process is optimized based on the updated weight of the access points in the communication network 100.

In an embodiment, the paging entity 300 can be advantageously used in a common centralized system in the communication network 100 or may be placed in each access point in the communication network 100. In the common centralized system, the entity 300 will include a separate list of priority levels for each access point in the communication network 100. The processor 302 is explained with necessary modules 312-316 and the incorporation of other modules for performing the necessary functions in the entity 300.

Figure 4:
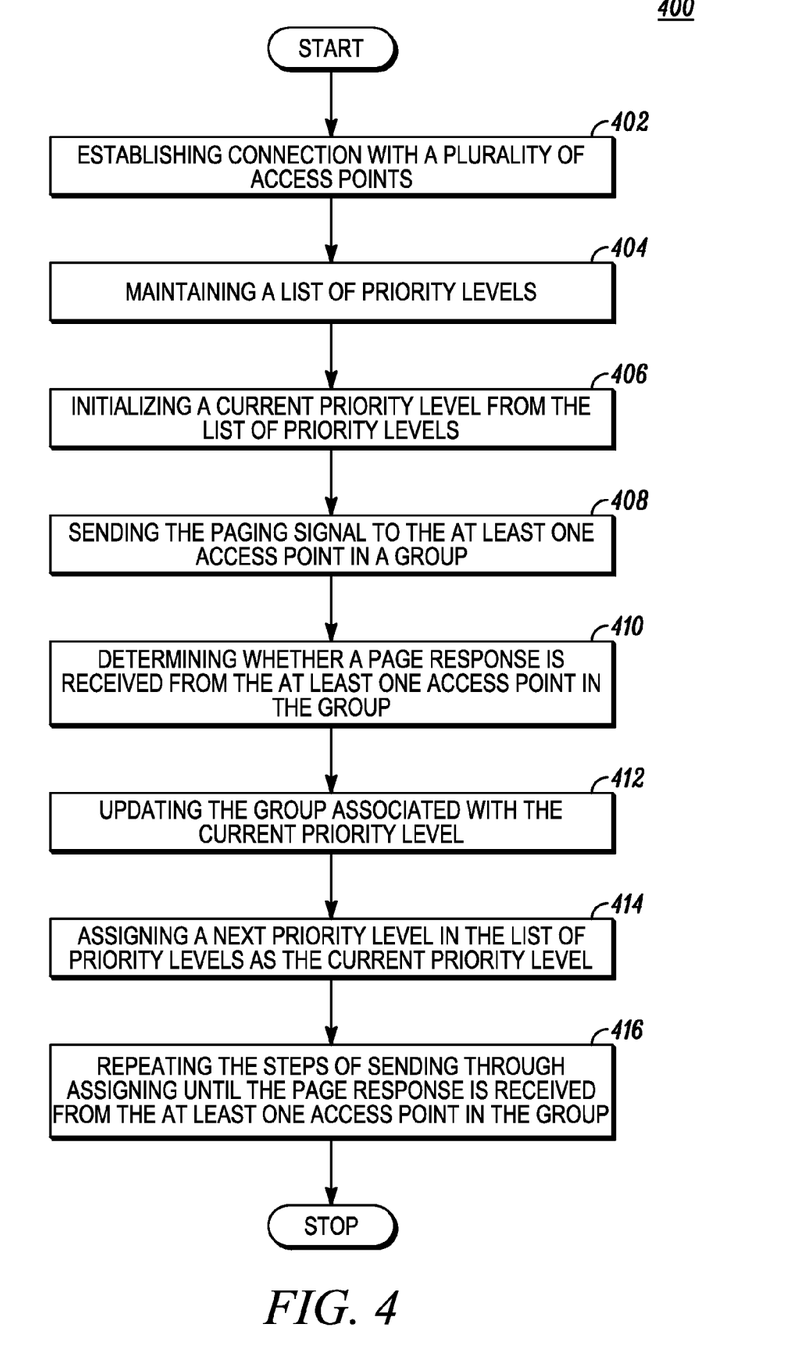
FIG. 4 is a flowchart of a method for optimizing paging in a communication network in accordance with some embodiments of the invention.

Referring to FIG. 4, a flowchart of a method for optimal paging in a communication network 100. In an embodiment, the method is described from the perspective of the access point 102 in optimizing the paging process in the communication network 100. The access point 102 establishes 402 connections with the plurality of access points 104-124 in the communication network 100. The paging entity for the access point 102 maintains 404 a list of priority levels 202, wherein each of the priority levels is associated with a group of at least one access point. For example, the priority levels in the list 202 are arranged according to priority as shown in FIG. 2.

The paging entity 300 in the access point 102 initializes 406 a current priority level from the list of priority levels 202. At the time of initialization, the current priority level can be any of the priority levels P1-P3. For example, in the list 202, each of the access points can be given the priority level P1 as the highest range of weights. After initialization, the priority level of the access points can be changed when the weights are changed and thresholds are passed as described. The entity sends 408 the paging signal to the at least one access point in a group associated with the current priority level. For example, the paging signal is sent to the access points 104-108 of the group associated with the current priority level P1.

The paging entity 300 further determines 410 whether a page response is received from the at least one access point in the group. For example, the entity in the access point 102 monitors for receiving the page responses for the pre-determined time interval. The pre-determined time interval is set by the paging response timer 318. If the page response is received during the time interval then the mobile station is found in that group. The process of further transmission of paging signal is terminated.

In an alternate embodiment, the paging entity also monitors for any other mobility activity occurred at each access point in the group for a time interval set by the priority refresh timer 308. The status of the flag register is updated based on the mobility observed at each access point. The paging entity further updates 412 the weight of their respective access points in the group associated with the current priority level. Furthermore, the access points in the groups are re-associated with a corresponding priority level based on the updated weights of the access points.

On the other hand, if no page response is received from any of the access points in the group, the entity assigns 414 the next priority level in the list of priority levels as the current priority level. Further, the above steps of sending 408 through assigning 414 are repeated 416 until the page response is received from the at least one access point in the communication network 100, thus, optimizing the paging process by limiting transmission to those access points in the current priority level. The probability of getting the page response from the top most priority levels is high, thereby preventing the transmission of paging signal to all the access points in the communication network 100.

Figure 5:
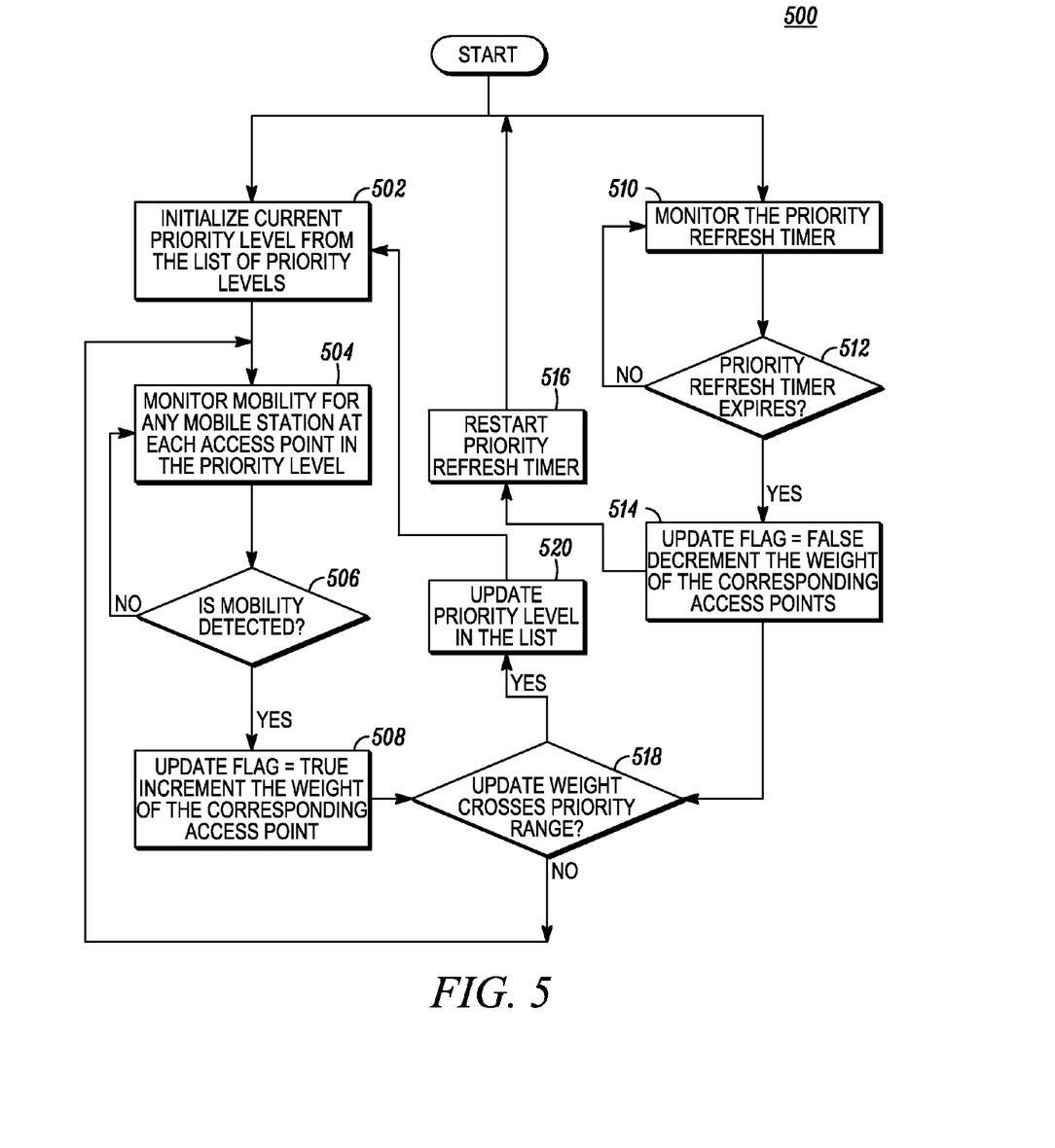
FIG. 5 is a flowchart of a method for maintaining and updating a priority list associated with the access point in the communication network in accordance with some embodiments of the invention.

FIG. 5 is a flowchart of a method for maintaining and updating a priority list associated with the access point in the communication network 100 in accordance with some embodiments of the invention. The method begins with initializing 502 the current priority level from the list of the priority levels 202 created within the paging entity 300. In an embodiment, the current priority level is considered as P1 from the plurality of priority levels P1-P3 and each access point is assigned a priority level of P1. In an alternate embodiment, different criteria can be considered to assign access points to different groups and priority levels.

The method 500 moves to next step, where the mobility is monitored 504 for any mobile station at each access point in the priority level P1. The mobility can be handoff, paging or other similar process at each access point in the priority level. If the mobility is detected 506, the update flag associated with the corresponding access point is changed to "True" status. In addition, the weight of an access point is increased 508 when mobility is detected in relation to that access point. On the other hand, if the mobility is not detected, the status of the update flag remains "False," and the step of monitoring 504 mobility is repeated.

The method 500 further checks whether the incremented/updated weight crosses 518 crosses the priority range assigned to the priority level P1. If the weight is within the range assigned to the priority level, the method 500 moves to the step of monitoring 504 mobility for any mobile station at each access point in the priority level. On the other hand, if the incremented weight crosses the assigned range, the priority level is updated 520 by re-associating the corresponding access point to a new priority level.

In an alternate embodiment, the method 500 monitors 510 the priority refresh timer and determines whether the priority refresh timer expires 512. If the priority refresh timer does not expire then the method 500 continues the step of monitoring 510 the priority refresh timer. On the other hand, if the priority refresh timer expires and the status of the update flag remains "False," the weight of the corresponding access points in the group associated with the priority level is decremented 514. The method 500 also restarts 516 the priority refresh timer and sets the status of all the update flags to "False." The method further moves to the step of monitoring 510 the priority refresh timer.

Further to the step of decrementing 514 the weight, the method 500, checks whether the decremented/updated weight crosses 518 the priority range. If the weight crosses the priority level, the step of updating 520 the priority level is repeated. Thus, the method 500 updates the weight and also the priority levels based on the mobility observed at each access point. The method 500 further continues to monitor for mobility as step 504 repeats.

Figure 6:
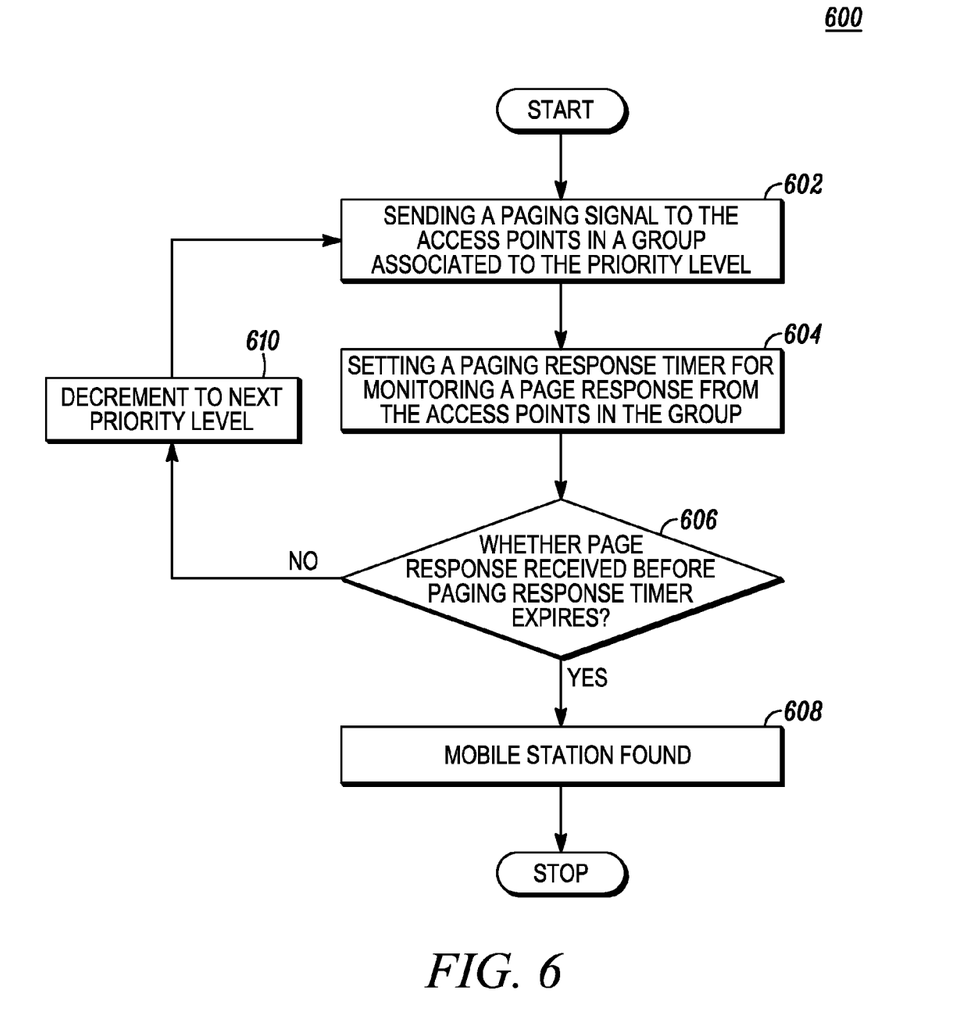
FIG. 6 is a flowchart of a method for determining whether a page response is received from at least one access point in the communication network in accordance with some embodiments of the invention.

FIG. 6 is a flowchart of a method for determining whether the page response is received from at least one access point in the network 100 as indicated in the steps of 408-412. The method 600 starts with sending 602 the paging signal to all the access points in a group associated with the priority level. The method 600 further moves to a next step where the paging response timer 318 is set 604 for monitoring the page response from the access points in the group. The access point 102 expects the page response from the at least one access point in the group within a pre-determined time interval set by the paging response timer 318.

The method 600 then determines 606 whether the page response is received from at least one access point in the group before the paging response timer 318 expires. If the page response is received from at least one access point in the group before the paging response timer 318 expires, the location of a mobile station 132 is found 608 and thus, the transmission of the paging signal is terminated.

On the other hand, if no page response is received, the method 600 decrements 610 to the next priority level and repeats the above steps of sending 602 to determining 606 until a page response is received from at least one access point in the communication network 100.

Thus, the paging entity optimizes the paging process and the transmission paging of paging signals by limiting the transmission to only those access points in the group associated with the current priority level. Moreover, the location of the mobile station 132 is easily located without much traffic loading on the communication network 100.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising:
maintaining a list of priority levels, wherein each of the priority levels is associated with a group of at least one access point and wherein maintaining the list of priority levels includes grouping a plurality of access points with one of the list of priority levels based on a weight of each of the plurality of access points;
initializing a current priority level from the list of priority levels, wherein the current priority level is a highest priority level, further wherein the highest priority level is associated with the group of at least one access point having a highest range of weights associated with group of at least one access point, the weight of an access point being incremented when mobility is observed to the access point, the mobility including connected mode mobility and idle mode mobility;
sending a paging signal to the at least one access point in a group associated with the current priority level;
determining whether a page response is received from the at least one access point in the group associated with the current priority level;
updating the group associated with the current priority level; and
assigning a next priority level in the list of priority levels as the current priority level when no page response is received from the at least one access point in the group associated with the current priority level.

2. The method of claim 1, wherein grouping the plurality of access points further comprises:
assigning a range for the weight for each of the list of priority levels; and
associating each of the plurality of access points to one of the list of priority levels, wherein the weight of each of the plurality of access points is within the assigned range for the associated priority level.

3. The method of claim 1, wherein grouping the plurality of access points further comprises prioritizing the list of priority levels based on the assigned range.

4. The method of claim 1, wherein updating the group further comprises:
re-grouping the access point to one of the groups associated with the priority levels based on the modified weight of the access point.

5. The method of claim 1, wherein modifying the weight further comprises:
incrementing the weight of the access point in the group when the mobility is observed to the access point; and
decrementing the weight of the access point in the group when no mobility is observed to the access point.

6. The method of claim 4, wherein re-grouping the access point further comprises associating the access point with a group associated with a different priority level when the modified weight of the access point is within the range of the different priority level.

7. The method of claim 1, wherein the weight of the access point includes the number of times the access point involved in mobility activity.

8. The method of claim 1, wherein determining whether the page response is received further comprises monitoring for the page response from the at least one access point in the group associated with the current priority level within a pre-determined time interval.

9. A method comprising:
creating a list of priority levels, wherein each of the priority levels is associated with a group of at least one access point,
initializing a current priority level from the list of priority levels, wherein the current priority level is a highest priority level, further wherein the highest priority level is associated with the group of at least one access point having a highest range of weights associated with group of at least one access point, a weight of an access point being incremented when mobility is observed to the access point, wherein the mobility activity includes connected mode mobility activity and idle mode mobility activity;
selecting a group associated with the current priority level in the list for sending a paging signal;
updating the weight of an access point in the selected group associated with the current priority level; and
associating the access point with one of the list of priority levels based on the updated weight of the access point.

10. The method of claim 9, wherein associating the access point further comprises assigning the access point to a group associated with a different priority level when the updated weight of the access point is within a threshold range of the different priority level.

11. An apparatus comprising:
a memory for maintaining a list of priority levels, wherein each of the priority levels is associated with a group of at least one access point; and
a processor coupled to the memory and operable to determine whether a page response is received from the at least one access point in the group associated with a current priority level, wherein the current priority level is a highest priority level, further wherein the highest priority level is associated with the group of at least one access point having a highest range of weights associated with group of at least one access point, a weight of an access point being incremented when mobility is observed to the access point, the mobility including connected mode mobility and idle mode mobility, sending the paging signal to the at least one access point in the group associated with a next priority level only when no page response is received from the current priority level and modifying the weight of an access point in response to the mobility of mobile stations associated with the access point.

12. The apparatus of claim 11, wherein each of priority levels comprises a list including at least one of an identification number and a weight.

13. The apparatus of claim 11, wherein the processor is further operable to update the next priority level as the current priority level, and to assign subsequent priority level from the list of priority levels as the next priority level until the page response is received from the at least one access point in the group associated with the current priority level.

14. The apparatus of claim 11 further comprises a paging response timer coupled to the processor for monitoring whether the page response is received within a pre-determined time interval.

15. The apparatus of claim 11 further comprises a priority refresh timer coupled to the processor for monitoring mobility activity at the access point within a pre-determined time interval.

16. The apparatus of claim 11, wherein the processor is further operable to store a threshold value for each of the priority levels and compare the modified weight of the access point with a corresponding threshold value for the current priority level.

17. The apparatus of claim 11, wherein the processor is further operable to update the priority level in the memory based on the modified weight of the access point.

* * * * *